April 10, 1945.  H. N. CHRISTOPHER  2,373,383
SELF-REGULATING RECTIFIER
Filed June 28, 1941
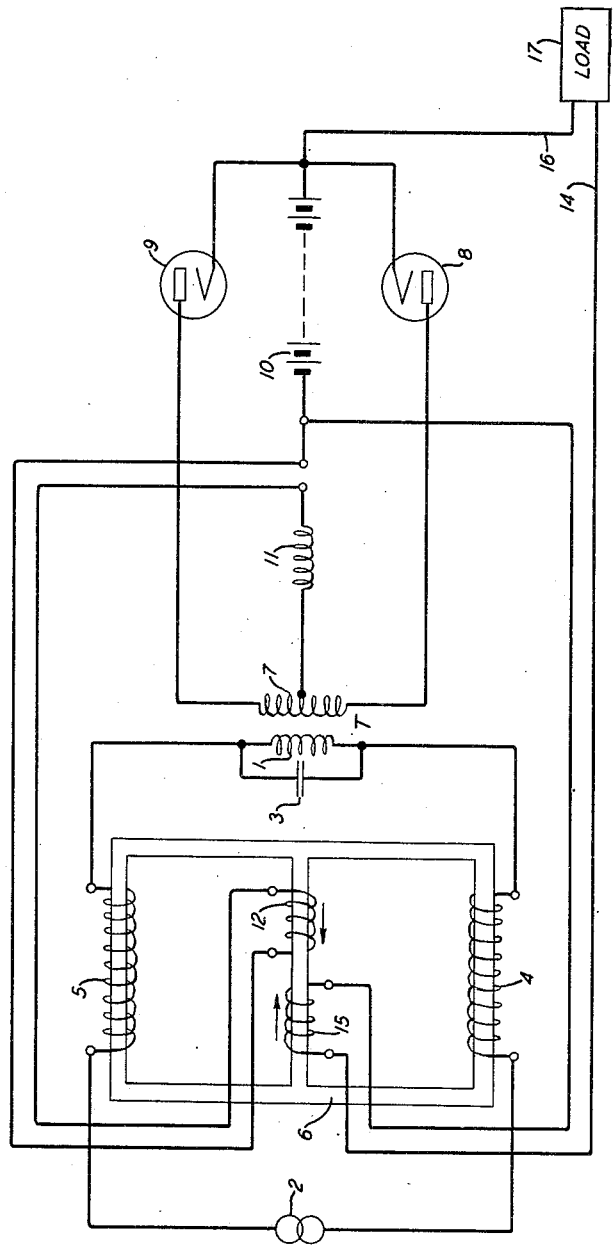
INVENTOR
H. N. CHRISTOPHER
BY
ATTORNEY Patented Apr. 10, 1945

2,373,383

UNITED STATES PATENT OFFICE 2,373,383

SELF-REGULATING RECTIFIER

Harold N. Christopher, Fanwood, N. J., assignor to Bell Telephone Laboratories, Incorporated, New York, N. Y., a corporation of New York Application June 28, 1941, Serial No. 400,321

5 Claims. (Cl. 320—10)

This invention relates to rectifiers and particularly to a self-regulating rectifier for use in charging storage batteries.

It is the object of this invention to provide a self-regulating rectifier which can be made not only to adjust its output to correspond to rapidly changing load conditions but also to materially reduce the alternating current and direct current line distortion caused by the operation of the rectifier.

Regulating devices for battery charging rectifiers employing saturable core reactors are commonly known as impedance regulating devices. The basic principle of their operation is to cause the inductance of a series reactor to increase in order to obtain low charging rates and to decrease when high charging rates are required. Such methods of control require comparatively large variations in the inductance of the series reactor in order to obtain the desired regulating effects. In addition, the alternating-current wave-shape distortion caused by the operation of an impedance regulated rectifier is considerable and is substantially the same as an unregulated rectifier for the same load conditions.

In accordance with a feature of the present invention, a regulating rectifier is provided in which the charging rate of the rectifier is made to directly follow the battery discharge rate and at the same time, to greatly reduce the distortion caused by the operation of the rectifier. More particularly, the rectifier of this invention employs the principle of resonance which permits complete control of the rectifier charging rate with comparatively nominal changes in the inductance of the series reactor.

The rectifier of this invention provides advantages over known impedance type regulating devices in that:

(1) The impedance of the series reactor is increased in order to increase the charging rate of the battery, and decreased to decrease the charging rate;

(2) The voltage that appears across the rectifier transformer is a function of the voltage drop across a fixed shunt condenser;

(2) The shunt condenser offers a low impedance path to harmonic currents generated within the rectifier;

(4) The series reactor offers maximum impedance to harmonics for high charging rates when maximum distortion occurs;

(5) Harmonic components that appear in the direct current charge and discharge circuits cancel out; and (6) The power factor approaches unity for maximum charging rates and becomes a leading power factor for lower charging rates.

The invention will be readily understood from the following detailed description made with reference to the accompanying drawing which is a diagrammatic representation of the rectifier of this invention.

The reference character T designates a rectifier transformer, the primary winding 1 of which is supplied with alternating current from the source 2. A fixed condenser 3 is connected directly across the primary winding of the transformer T. A saturable core reactor 6 is interposed between the primary winding of transformer T and the alternating-current source 2 and consists of three horizontal legs whose extremities are joined by means of two vertical legs.

On the upper horizontal leg of core 6 there is wound a coil 5 which is included in one of the alternating-current line conductors extending from the source 2 to the transformer primary 1. On the lower outside leg is wound a coil 4 which is included in the other alternating-current line conductor connecting the transformer T to the source 2. A pair of windings 12 and 15 are wound on the center or intermediate leg of core 6, the purpose of which will be indicated presently. These coils are wound differentially with respect to each other.

The secondary winding 7 of transformer T has its outer terminals connected each to a plate electrode of the rectifier tubes 8 and 9, respectively. A reactance coil 11 is connected between the left terminal of battery 10 and a center tap on the secondary 7 by way of the coil 12. The position of coil 12 obviously, is such that it carries the charge current to the battery 10. The right terminal of battery 10 is connected to both filaments of the rectifier tubes 8 and 9 and to the conductor 16 extending to the load schematically shown at 17. The left terminal of battery 10 is connected also to the load conductor 14 by way of the winding 15. The position of coil 15 is such obviously, as to be traversed by the load or discharge current.

These coils, when traversed by direct currents serve to vary the degree of saturation of the reactor core 6 and since, as stated hereinbefore, they are wound differentially, the saturating flux is produced by the net ampere turns of both coils resulting in control of the magnitude of the inductance of the reactor windings 4 and 5.

The reactor coils 4 and 5 and the condenser 3 are so designed that the values of inductance and capacity are such that a condition of resonance is approached at the frequency of the supply source 2 in order to increase the rectifier charging rate. In other words, if the frequency of the supply source is 60 cycles, the values of inductance and capacity are so selected that, as the inductance of the series reactor is increased, a condition of resonance is approached, resulting in a sharp rise in potential across condenser 3 at 60 cycles. This is in accordance with well-known principles of resonance and resonant frequency which teach that an inductive reactance $2\pi fL$ increases directly in proportion with frequency, and that a capacitive reactance $$\frac{1}{2\pi fC}$$

varies inversely with frequency, so that at some particular values of inductance L and capacity C these two reactances will cancel out and the value of frequency at which this occurs is known as the resonant frequency, and a condition of resonance at that frequency is attained.

The inductance of the reactors 4 and 5 is made to vary in accordance with variations in the load current by means of the charge and discharge coils 12 and 15 which function to vary the degree of saturation of the reactor core 6. These two windings are differentially adjusted so that maximum saturation of the core material 6 is obtained for some predetermined minimum charging rate and load condition. Thus as the load increases, the saturation decreases resulting in an increase in inductance of windings 4 and 5. With the circuit constants properly chosen, a sharp rise in potential across condenser 3 is obtained as the inductance of windings 4 and 5 increases and resonance at the frequency of the supply source 2 is approached. Since the charging rate is a function of the voltage across the primary winding 1 of transformer T, the charging rate will increase as the potential across condenser 3 increases.

Conversely, as the load current decreases, the saturating flux increases, the inductance of coils 4 and 5 decreases, the voltage across condenser 3 decreases and the rate at which the battery 10 is charged reduces.

It will be noted that when the rectifier is working at its maximum load, the inductance of coils 4 and 5 will be at a maximum value. Also when the rectifier is working at maximum load, the generation of harmonics due to wave-shape distortion of the supply source 2 is greatest. There is then a condition which prevails in which the series inductance is greatest when the tendency for the rectifier to generate harmonics is greatest, and since this inductance is connected in series with the alternating-current supply line, it acts as a high impedance to these harmonics and effectively shields the alternating-current line from them. The condenser 3 also serves as a low impedance shunt path for these harmonics as a further insurance against their entry into the alternating-current line. In this manner the regulating means of this invention not only serves to regulate the rectifier in accordance with the load demands, but also functions as a filter to reduce the alternating-current line distortion caused by the operation of the rectifier. This filtering effect becomes increasingly effective with frequency and is most effective for the higher charging rates.

Harmonic components that appear in the charge and discharge coils 12 and 15 respectively, are oppositely poled and tend to cancel out.

Though the disclosure illustrates a system for regulating the rectifier output which involves a variable series reactance and a fixed shunt capacity, it is to be understood that the same results may be obtained by using a fixed series reactance and a variable shunt capacity.

What is claimed is:

1. In combination, a source of alternating current, a rectifier receiving current from said source, a battery and a load circuit receiving current from said rectifier, a transformer coupling said rectifier to said source, a three-legged regulating saturable core reactor interposed between said source and the primary of said transformer having an inductive reactance coil wound on each of the outer legs of the reactor core and connected in series with the primary winding of said transformer, a pair of differentially wound coils on the middle leg of the reactor core, one of said coils being subject to the current received by said battery from the rectifier and the other of said coils being subject to the current received by said load circuit, and a capacitive reactance connected across the primary winding of said transformer.

2. In combination, a rectifier, a source of alternating current, a battery and load circuit receiving current from said source by way of said rectifier, said rectifier inherently generating harmonics of the frequency of said source when operating to supply said battery and load circuit, a reactor included in series with said source, means for regulating the impedance of said series reactor so that the impedance thereof offered to the generated harmonics will be a maximum when the rectifier is supplying maximum current to said battery and load circuit, and a low impedance shunt path for the generated harmonics connected across the input to said rectifier.

3. The combination in a battery charging system of an alternating-current supply source, a battery and a load circuit, a rectifier for supplying direct current from said source to said battery and said load circuit, a transformer coupling said rectifier to said supply source, a condenser connected across the input of said transformer, and means for regulating the charging rate to said battery comprising a saturable core reactor included in series with the primary winding of said transformer, said reactor and shunt condenser having values of inductance and capacity respectively, such that a sharp rise in potential across the condenser is obtained as resonance at the frequency of the supply source is approached and the charging rate to said battery is a maximum, and means comprising a pair of windings included in the charge and discharge leads of said battery for decreasing the inductance of said series reactor when the current supplied to said load decreases, whereby the potential across said condenser decreases and the charging rate to said battery decreases accordingly.

4. In combination in a battery charging system, an alternating-current line having an alternating-current source associated therewith, a battery, a rectifier for rectifying the alternating current from said source into direct current and supplying the rectified direct current to said battery, means for reducing the alternating-current line distortion caused by the operation of said rectifier comprising inductive windings included in series in said alternating-current line and a condenser connected across the input to said rectifier, a magnetic core comprising three parallel legs interconnected by a pair of yoke pieces, said inductance windings being wound upon the two outer legs of said core, and means for increasing the inductance of said inductive windings as the direct current supplied to said battery increases, whereby the voltage impressed on said condenser increases and the charging rate to said battery increases accordingly.

5. In combination, a source of alternating current having a constant terminal voltage, a battery, a load, a rectifier for supplying direct current from said source to said battery and load and adapted to maintain a constant voltage across the terminals of said battery under varying conditions of said load, a transformer connecting said rectifier to said source of alternating current, and means for regulating the output of said rectifier so as to maintain a constant voltage at the terminals of said battery under the conditions of substantially constant impedance at the terminals of said rectifier and constant terminal voltage of the source of alternating current regardless of the variations in the load, comprising a reactance element included in series with the primary of said transformer and a reactance element connected in shunt with the primary of said transformer, and means responsive to variations in the load current for varying the value of one of said reactances whereby the potential impressed on the rectifier from said source is varied accordingly.

HAROLD N. CHRISTOPHER.